(12) United States Patent
Kim (10) Patent No.: US 9,718,401 B2
(45) Date of Patent: Aug. 1, 2017

(54) FOLDABLE EMERGENCY ROAD SIGN

(71) Applicant: Tae Won Kim, Gimhae-si (KR)

(72) Inventor: Tae Won Kim, Gimhae-si (KR)

(73) Assignee: Tae Won Kim (KR)

( * ) Notice: Subject to any disclaimer, the term of this patent is extended or adjusted under 35 U.S.C. 154(b) by 137 days.

(21) Appl. No.: 14/443,610

(22) PCT Filed: Nov. 28, 2013

(86) PCT No.: PCT/KR2013/010877
§ 371 (c)(1),
(2) Date: May 18, 2015

(87) PCT Pub. No.: WO2014/084615
PCT Pub. Date: Jun. 5, 2014

(65) Prior Publication Data
US 2015/0314728 A1    Nov. 5, 2015

(30) Foreign Application Priority Data

Nov. 30, 2012  (KR) .......................... 10-2012-0137645
Nov. 25, 2013  (KR) .......................... 10-2013-0143749

(51) Int. Cl.
    *B60Q 7/00*       (2006.01)
(52) U.S. Cl.
    CPC ..................................... *B60Q 7/00* (2013.01)
(58) Field of Classification Search
    CPC ....................................................... B60Q 7/00
    USPC ...... 116/63 R, 63 T, 63 P, 28 R; 40/610, 612
    See application file for complete search history.

(56) References Cited

U.S. PATENT DOCUMENTS

| 2,483,463 | A | * | 10/1949 | Jeffries | E01F 9/688 |
| | | | | | 116/63 P |
| 2,781,017 | A | * | 2/1957 | Fuller | E01F 9/688 |
| | | | | | 116/63 R |
| 2,806,670 | A | * | 9/1957 | Straster | B60Q 7/005 |
| | | | | | 116/63 P |
| 3,200,786 | A | * | 8/1965 | Swezy | E01F 9/688 |
| | | | | | 116/173 |
| 3,334,856 | A | * | 8/1967 | Corey | F16M 11/242 |
| | | | | | 116/63 P |
| 3,593,016 | A | * | 7/1971 | Gerdel | B60Q 7/00 |
| | | | | | 116/63 P |
| 3,933,119 | A | * | 1/1976 | Hedgewick | B60Q 7/005 |
| | | | | | 116/63 P |

(Continued)

FOREIGN PATENT DOCUMENTS

| KR | 10-2002-0083992 | 12/2002 |
| KR | 20-2003-0033711 | 10/2003 |

(Continued)

*Primary Examiner* — R. A. Smith
*Assistant Examiner* — Tania Courson
(74) *Attorney, Agent, or Firm* — Innovation Counsel LLP (57) ABSTRACT

Disclosed herein is a foldable emergency road sign which includes a bar-shaped handle, a hollow shaft connected to the bar-shaped handle, a spring pipe, the spring pipe having a hole through which the hollow shaft is inserted, a plurality of bodies connected to the spring pipe, wherein the plurality of bodies can be folded or unfolded to have a triangular pyramid shape or a quadrangular pyramid shape, and a light emitting unit attached at regular intervals to one side of the plurality of bodies.

18 Claims, 5 Drawing Sheets

(56) References Cited

U.S. PATENT DOCUMENTS

| | | | | |
|---|---|---|---|---|
| 4,124,196 | A * | 11/1978 | Hipskind | E01F 13/028 116/63 P |
| 5,400,019 | A * | 3/1995 | Riscoe, Jr. | G08G 1/0955 116/63 P |
| 6,265,969 | B1 * | 7/2001 | Shih | B60Q 7/00 340/468 |
| 6,637,904 | B2 * | 10/2003 | Hernandez | B60Q 7/00 362/11 |
| D514,009 | S * | 1/2006 | Parr | D10/113.2 |
| 7,392,610 | B2 * | 7/2008 | Jedlicka | G09F 15/0062 116/173 |
| 8,631,755 | B2 * | 1/2014 | Klein | E01F 13/028 116/63 C |
| 2004/0255839 | A1 * | 12/2004 | Greves | B60Q 7/005 116/63 P |
| 2008/0036584 | A1 * | 2/2008 | Lang | B60Q 7/00 340/473 |
| 2015/0114281 | A1 * | 4/2015 | Bartuli | B60Q 7/005 116/63 T |

FOREIGN PATENT DOCUMENTS

| | | |
|---|---|---|
| KR | 10-2005-0045280 | 5/2005 |
| KR | 10-2009-0027808 | 3/2009 |
| KR | 10-2011-0009624 | 1/2011 |
| KR | 10-2011-0116596 | 11/2011 |

\* cited by examiner

Figure 10

FOLDABLE EMERGENCY ROAD SIGN

CROSS-REFERENCE TO RELATED APPLICATION

This is a U.S. National Stage application under 35 U.S.C. 371 of International Application No. PCT/KR2013/010877, filed on Nov. 28, 2013, which claims priority to and the benefit of Korean Patent Application No. 10-2012-0137645 filed on Nov. 30, 2012 and 10-2013-0143749 filed on Nov. 25, 2013, the entire contents of which are incorporated herein by reference.

BACKGROUND (a) Technical Field

The present inventive concept relates to an emergency tripod for traffic accident prevention, and in particular to a foldable emergency road sign which can be made in a compact-sized structure like an umbrella and can be easily folded or unfolded.

(b) Background Art

A traffic accident prevention emergency tripod in general is used to provide a driver of a following vehicle with a warning sign when a vehicle has a trouble or an accident in the middle of the driving. Such a tripod may be installed on a vehicle body, for example, a trunk lid, etc. or may be designed to stand on a road.

In case of the emergency tripod which is intended to be installed on a vehicle body, for example, a trunk lid, etc., a separate structure for fixing the emergency tripod on a vehicle body is inevitably used, so it needs to modify a structure of the vehicle, if necessary, and to install a special flash light at the emergency tripod so that a driver of a following vehicle can easily recognize the emergency situation ahead, for which the whole structure becomes complicated, while entailing high costs.

In case of the emergency tripod which is intended to stand on a road, it is hard to stably fix the emergency tripod, in place, on the road. Since this type of the emergency tripod is not equipped with a light-emitting function, it is insufficient to attract a following driver's attention if the vehicle runs at a high speed.

In order to resolve the above-mentioned problems, the Korean patent registration number 10-1157800 (Jun. 13, 2012) discloses "a traffic safety sign board with ease of installation and improved visibility".

The above mentioned conventional structure includes a lower support unit having a magnet or a suction fastening device; a connection bar of which one end is connected to the lower support unit and the other end is connected to the body; and a triangular body connected to the connection bar. In the body, at least one LED assembly is attached at a regular interval. The LED assembly includes at least one LED; a light transmission unit which covers the light emitting portions of the LED and is configured to transmit the light of the LED to the outside; and a fixing unit positioned at the bottom of the LED. The light transmission unit includes at least one thin film light transmission unit for alleviating glaring just in front of the LED while improving the visibility from a distant place, wherein the thickness of the light transmission portion is thin; and at least one rear film light transmission unit wherein the thickness of the light transmission portion configured to emit light toward the side surface of the LED by dispersing wide the light of the LED is thicker than the thin film light transmission unit. It is characterized in that the light transmission portion is mad in a 3D shape.

The above-described conventional technology provides a lower support unit having a magnet or a suction fastening device, a connection bar connecting the lower support unit and the body, and an LED assembly attached to the body, and the connection bar includes an attaching and detaching unit for the sake of easier separation and engagement between the lower support unit and the body, however there may be a complicated procedure since it needs to separately engage each component in the course of installation.

The Korean patent registration number 10-1304728 (Aug. 30, 2013) entitled "a traffic safety sign board for multiple purposes".

According to the above patent, the traffic safety sign tripod, which is installed at a periphery of a parking vehicle and provides a caution or warning to a driver of a following vehicle, includes a rectangular bottom side reflector equipped with a high luminance light emitting diode so as to enhance the visibility in the daytime and at night, two equal side reflectors which are secured to both ends of the bottom side reflector, thus forming a triangle, a two-angle support body which supports one lower side of the bottom side reflector at a predetermined height from the surface of the road, and a triangular support handle which is configured to support the other lower side of the bottom side reflector at a predetermined height from the surface of the road and to play a role as a handle and a battery holder.

According to the above-described conventional art, it needs to assemble each component when storing in a vehicle and using it, which causes a lot of inconvenience, and the safety board assembled with the above-mentioned components is not stable.

SUMMARY

Accordingly, the present inventive concept is made to improve the above-mentioned problems. The present inventive concept provides a foldable emergency road sign which can be quickly and easily installed using a button based on an automatic unfolding principle like in an umbrella, while providing easier storing and carriage.

a foldable emergency road sign which provides an improved visibility so that a driver of a following vehicle which runs at a high speed or a pedestrian can easily recognize from a distant or short distance and at a front side and a lateral side in such a way to install LED light emitting units at regular intervals.

To achieve the above objects, there is provided a foldable emergency road sign which is intended to be installed so as to prevent traffic accident under emergency situation wherein a vehicle stops due to a trouble or an accident on the road, which may include a bar-shaped handle; a hollow shaft connected to the bar-shaped handle; a spring pipe, the spring pipe having a hole through which the hollow shaft is inserted, a plurality of bodies connected to the spring pipe, wherein the plurality of bodies can be folded or unfolded to have a triangular pyramid shape or a quadrangular pyramid shape, and a light emitting diode attached at regular intervals to one side of the plurality of bodies.

The foldable emergency road sign may further include a compression ring inserted outside of the hollow shaft; and a plurality of first link shafts each connected between the compression ring and the plurality of bodies.

The foldable emergency road sign may further include a housing into which a spring is inserted; and a plurality of second link shafts connected between the housing and the plurality of the first link shafts, respectively The foldable emergency road sign may further include an engaging protrusion disposed at one end of the hollow shaft.

The foldable emergency road sign may further include an engaging groove disposed at the other end of the hollow shaft.

The foldable emergency road sign may further include a reflection plate disposed between the bodies.

The foldable emergency road sign may further include a ring having a plurality of holes, a plurality of wires, one ends of the plurality of wires being inserted to respective holes, and a magnet ring connected to the other ends of the plurality of wires.

The foldable emergency road sign may further include a second foldable road sign. An engaging protrusion of the second foldable road sing may be connected to the engaging groove disposed at the other end of the hollow shaft.

It is advantageous that the foldable emergency road sign according to the present inventive concept can be quickly unfolded using a button based on the principle of an automatic umbrella, and its storing and carrying are easy, and the LED light emitting units are installed at regular intervals, so a driver of a following vehicle which runs at a high speed, in particular, at night, or a pedestrian can easily recognize the tripod from a distance or short distance or at a front side or a lateral side, thus enhancing visibility.

DETAILED DESCRIPTION OF THE EMBODIMENTS

The foldable emergency road sign which is intended to be installed so as to prevent traffic accident under emergency situation wherein a vehicle stops due to a trouble or an accident on the road.

The foldable emergency road sign according to the present inventive concept will be described in detail with reference to the accompanying drawings.

Figure 1:
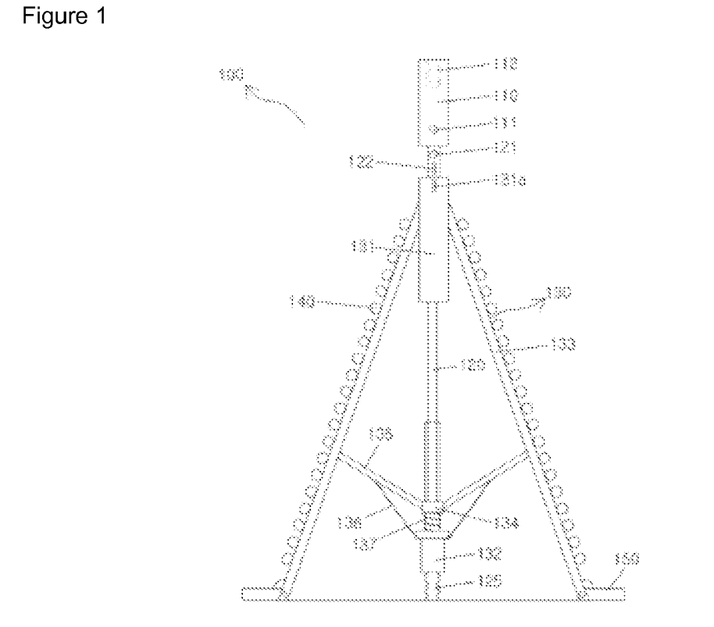
FIG. 1 is a view illustrating an unfolded state of a foldable emergency road sign according to the present inventive concept.
Figure 2:
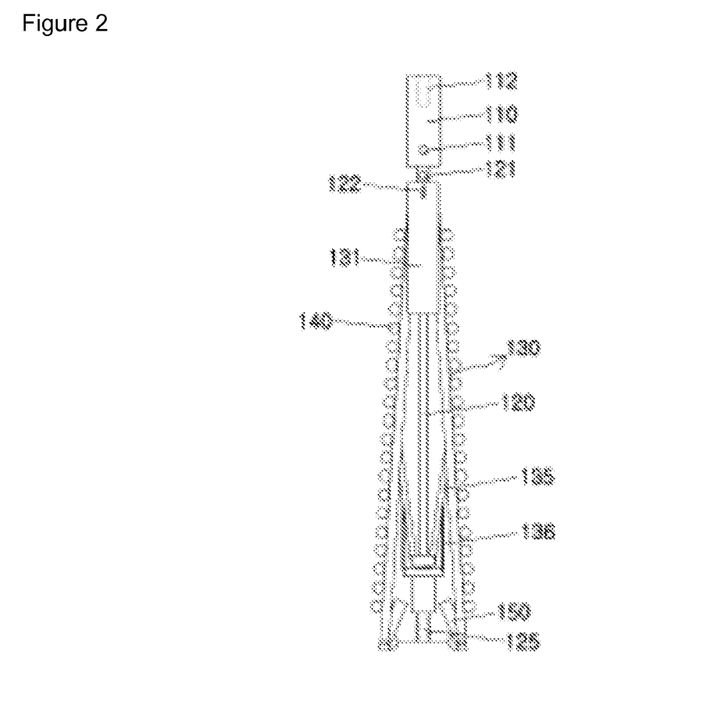
FIG. 2 is a view illustrating a folded state of a foldable emergency road sign according to the present inventive concept.

FIG. 1 is a view illustrating a unfold state of the foldable emergency road sign according to the present inventive concept. FIG. 2 is a view illustrating a folded state of a foldable emergency road sign according to the present inventive concept.

The automatic unfolding type LED safety tripod 100 according to the present inventive concept may include a bar-shaped handle 110, a hollow shaft 120 which protrudes downward from the bottom of the handle 110, a body 130 which may be folded in a straight shape or may be unfolded in a triangular pyramid shape or a quadrangular pyramid shape when it ascends or descends along the hollow shaft 120, and a light emitting unit 140 wherein at least one LED are attached at regular intervals along a side of the body 130.

On the hollow shaft 120, there are provided a hook 122 which protrudes outward from a side surface of the top of the hollow shaft 120, and a push button 121 configured to allow the hook 122 to pop out or be depress into the inside of the hollow shaft 120.

In particular, the body 130 can ascend or descend along the hollow shaft 120 and can be folded in a straight shape or can be unfolded in a triangular pyramid shape or a quadrangular pyramid shape since the hook pops out or is depress into the inside of the hollow shaft by means of the push button 121.

Hereinafter, the body 130 will be described. The body 130 is passed through by the hollow shaft 120. At a top of the hollow shaft 120, there is installed a spring pipe 131 which has an engaging hole 131a to which the hook 122 is detachably engaged. The spring pipe 131 has a hole through which the hollow shaft 120 is inserted into the hole.

In addition, there is provided a hollow body-shaped housing 132 which is passed through by the hollow shaft 120 at a bottom of the hollow shaft 120 which spaced-apart at a predetermined distance from the spring pipe 131. A spring 137 is mounted in the inside of the housing 132.

In addition, at an outer side surface of the housing 132, there are installed a plurality of support members 133 which are arranged at regular intervals in a circumferential direction. The support members 133 are connected to a compressing ring 134 which is disposed on the housing 132. A compression ring 134 which is passed through by the hollow shaft 120 is disposed between the compressing ring 134 and the housing 132. The compression ring is inserted outside of the hollow shaft 120. A first link shaft 135 is pivotally connected between an outer side surface of the compression ring 134 and the support members 133 for the sake of cooperation with the support members 133. A second link shaft 136 is pivotally connected between the housing 132 and the first link shaft 135 to operate in cooperation with each other.

Therefore, in the folded state as illustrated in FIG. 2, when the spring pipe 131 is pulled in the direction of the top to hook the engaging hole 131a formed through the spring pipe 131 onto the hook 122 positioned on the top, the support member 133 pivotally connected to the compression ring 134 through the first link shaft 135 is folded in the direction of the hollow shaft 120, and the compression spring moves downward along the hollow shaft with the aid of the first link shaft 135 connected between the support member 133 and the compression ring 134 and compresses the spring 137 mounted inside the housing 132, so the whole configuration of the safety tripod 100 becomes a folded shape.

At this time, since the second link shaft 136 is pivotally connected between the housing 132 and the first link shaft 135, the distance where the housing 132 moves downward along the hollow shaft 120 can be limited.

In addition, in a state where the foldable emergency road sign is unfolded, when the hook 122 of the hollow shaft 120 is released from the engaging hole 131a, the spring 137 compressed in the housing expands and pushes upward the compression ring 134. At this time, the first link shaft 135 one end of which is pivotally connected to the outer circumferential surface of the compression ring 134 is unfolded in both directions, and the support member 133 pivotally connected to the other end of the first link shaft 135 can be unfolded in both directions from the hollow shaft 120.

The operations where the hook 122 pops out from the hollow shaft 120 or is depressed into the hollow shaft 120 with the aid of the push button, and the hook 122 is attachable to or detachable from the engaging hole 131a of the spring pipe 131 like a hook of the umbrella.

Meanwhile, a switch button 111 may be further provided on the bar shaped handle 110.

The switch button 111 is provided to turn on or off the LED of the LED light emitting unit 140. The procedure for pressing the switch button 111 may include three steps.

The light emitting unit (LED) is turned on when pushing the push button once. The light emitting unit 140 flashes when pushing the push button twice. The light emitting unit 140 is turned off when pushing the push button third times.

In addition, a battery (not illustrated) may be provided in the inside of the handle 110, thus supplying electric power to the light emitting unit 140.

Figure 3:
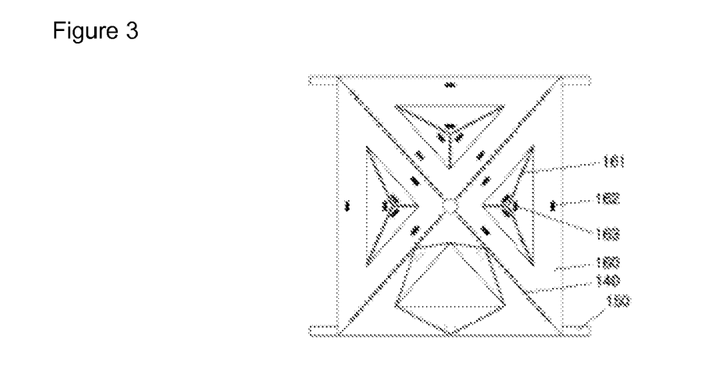
FIG. 3 is a plan view illustrating an unfolded configuration of a foldable emergency road sign according to the present inventive concept.

FIG. 3 is a plane view illustrating a state where the foldable emergency road sign is unfolded according to the present inventive concept.

As illustrated in FIG. 3, the foldable emergency road sign 100 according to the present inventive concept is a quadrangular or triangular shape in a plan view when it is unfolded. However it is a quadrangular pyramid shape or a triangular pyramid shape in a perspective view when it is installed upright with the aid of the support members 133.

In addition, the reflection plate 160 is installed between the support members 133. The reflection plate 160 may be made of a high luminance reflection fabric or a meshed material.

Here, the reflection plate 160 has less deviation in luminance and color even when a viewing angle changes or is able to prevent any scattered reflection, so the reflection plate can provide the best attention-drawing effects in daytime and at night.

In particular, a zipper 161 may be attached to the reflection plate 160 for the sake of opening and closing like a tent. The magnet 163 may be attached to the reflection plate 160 which is intended to open or be closed, and a metallic fixed piece 162 located opposite to the magnet 163 may be attached to an edge portion of the reflection plate which is intended not to open or be closed, so the reflection plate 160 can be opened by the zipper and can be folded in the direction of one side, and the magnet 163 can be positioned at the fixed piece 162, so the folded reflection plate can be stably fixed.

Figure 4:
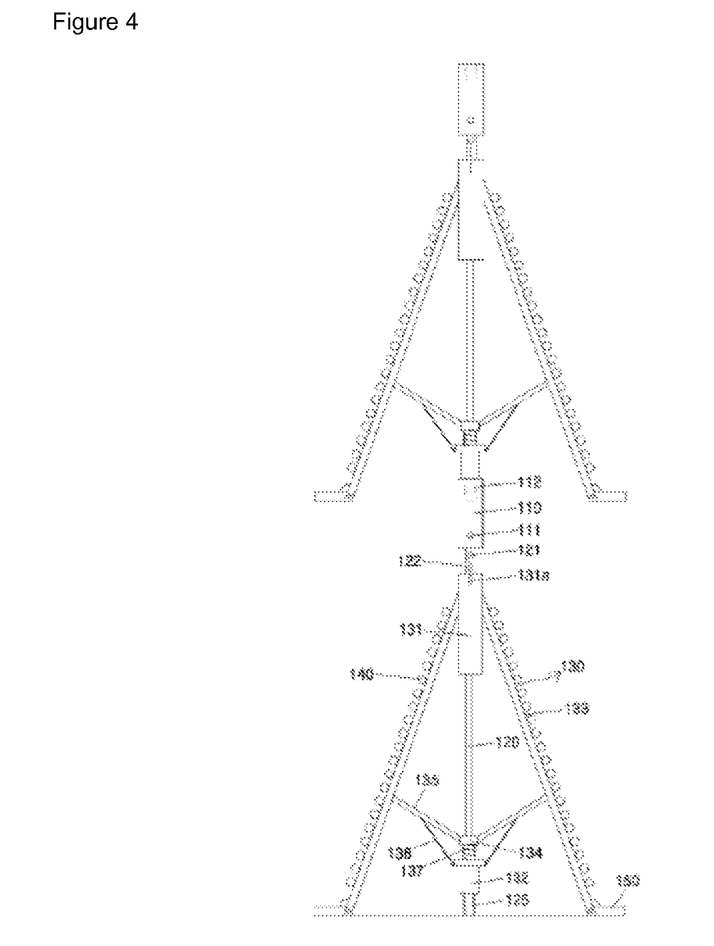
FIG. 4 is a view illustrating a stacking structure of a foldable emergency road sign according to the present inventive concept.

FIG. 4 is a view illustrating a stacking structure of the foldable emergency road sign according to the present inventive concept.

In addition, as illustrated in FIG. 4, an engaging protrusion 125 may be formed at the bottom of the hollow shaft 120, and an engaging groove 112 may be formed on the top of the bar shaped handle 110, and threads are formed on the outer circumferential surface of the engaging protrusion 125 and on the inner circumferential surface of the engaging groove 112. The engaging protrusion 125 and the engaging groove are not limited to the above configuration, but other coupling structures, such as clamp, may be used to combine the foldable emergency road signs 100.

Therefore, in a state where the foldable emergency road sign 100 stands upright, it is possible to stack a plurality of the foldable emergency road sign 100 in such a way to insert the engaging protrusion 125 formed at the lower side of the hollow shaft 120 of another foldable emergency road sign 100 into the engaging groove 112 formed on the top of the handle 110.

In this way, it is possible to recognize the position of any accident from a distant place on the road which may have lots of up and down hills. In addition, it is very efficient to send off an SOS if such emergency situation takes place.

Figure 5:
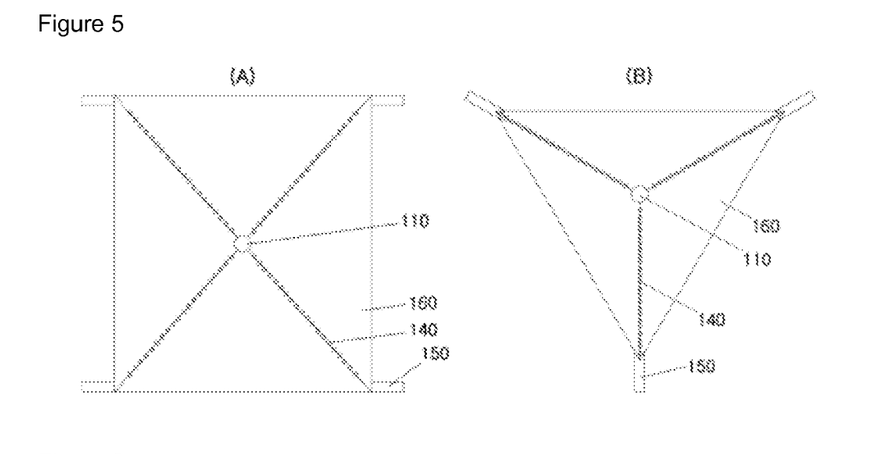
FIGS. 5 and 6 are plan views illustrating a variant in a configuration of a foldable emergency road sign according to the present inventive concept.
Figure 6:
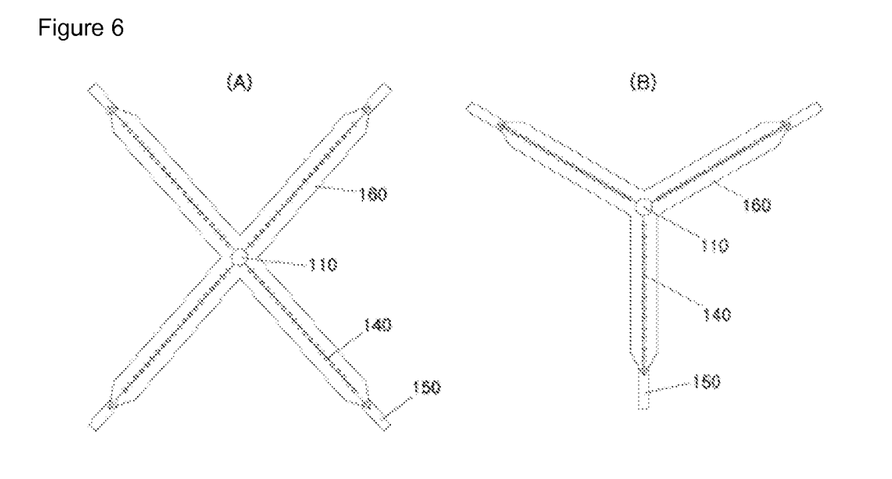

FIGS. 5 and 6 are views illustrating a variant in a configuration of a foldable emergency road sign according to the present inventive concept.

As illustrated in FIG. 5, the foldable emergency road sign according to the present inventive concept may be configured in a triangular pyramid shape or quadrangular pyramid shape, and in particular, as illustrated in FIG. 6, the foldable emergency road sign can be more efficiently used in a place where there is a lot of wind by installing the reflection plate in such a way to have a predetermined width without installing the reflection plate 160 between the support members 150.

Figure 7:
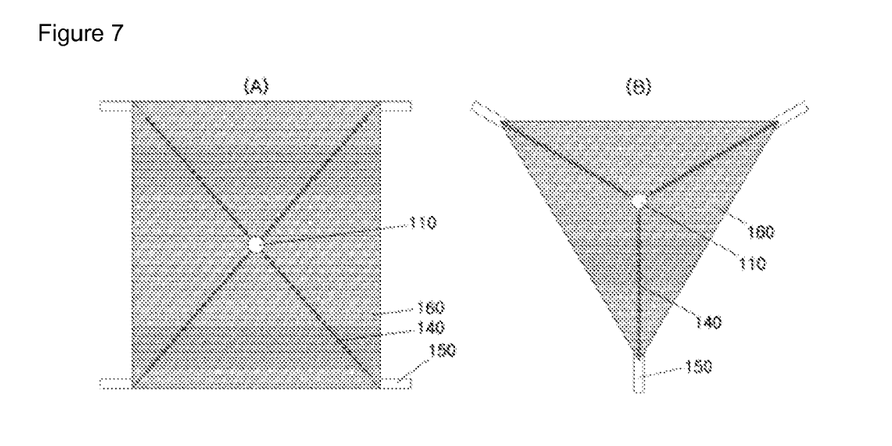
FIG. 7 is a plan view illustrating a state where a reflection plate made of a meshed material is attached to a foldable emergency road sign according to the present inventive concept.

FIG. 7 is a view illustrating a state where a reflection plate made of a meshed material is attached to a foldable emergency road sign according to the present inventive concept.

As illustrated in FIG. 7, the reflection plate 160 is made of a meshed material so as to use at a place where there is a lot of wind, thus resolving the problems that the foldable emergency road sign 100 of the present inventive concept easily falls down by wind.

Figure 8:
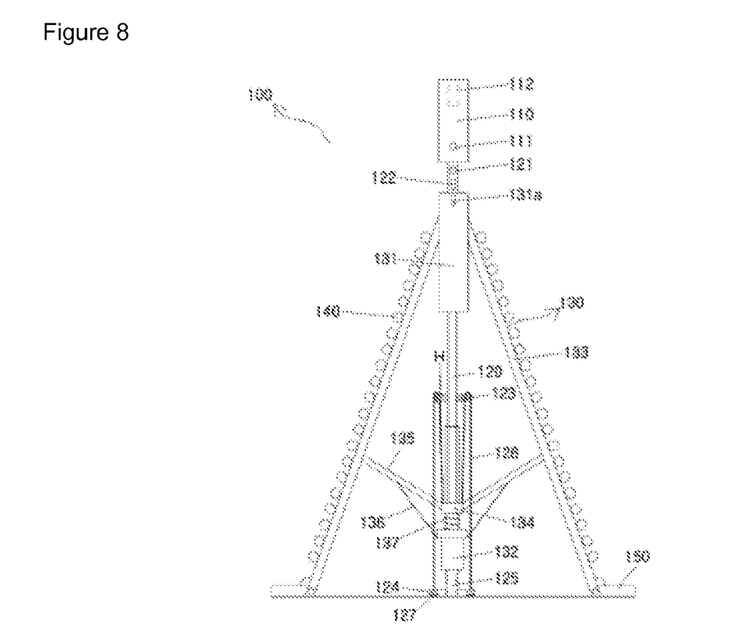
FIGS. 8 and 9 are views illustrating an exemplary embodiment wherein a weight and a cylindrical magnet are attached to a foldable emergency road sign according to the present inventive concept.
Figure 9:
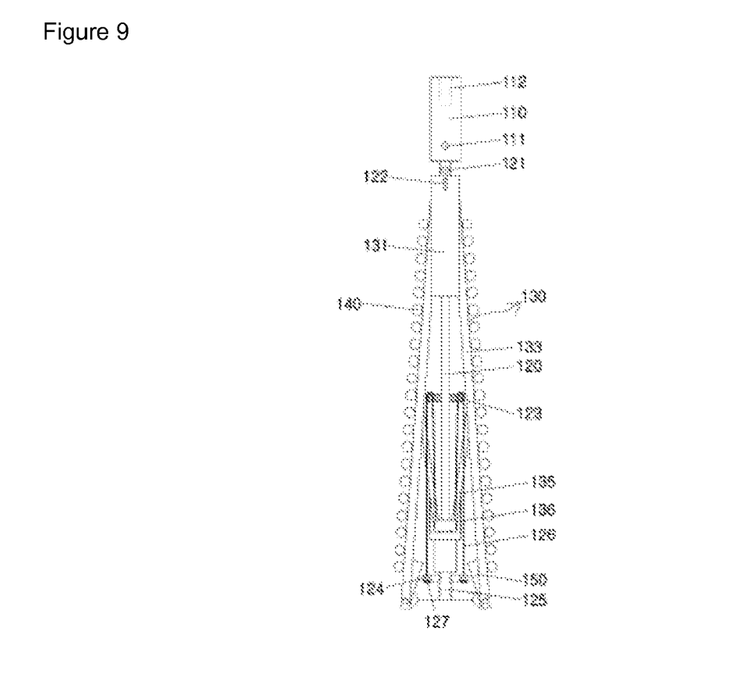
Figure 10:
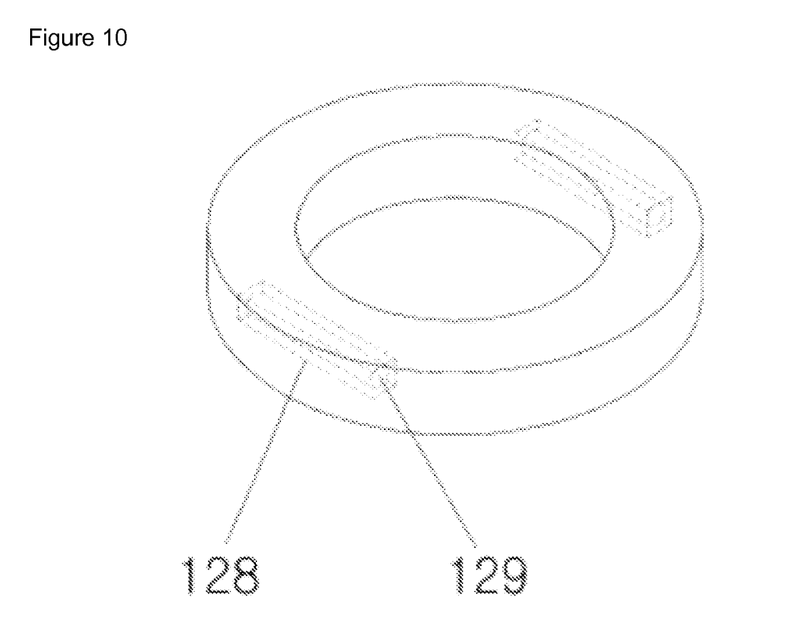
FIG. 10 is a detailed view illustrating a cylindrical magnet which is attached to a foldable emergency road sign according to the present inventive concept.

FIGS. 8 and 9 are views illustrating an exemplary embodiment wherein a weight and a cylindrical magnet are attached to a foldable emergency road sign according to the present inventive concept, and FIG. 10 is a detailed view illustrating a cylindrical magnet which is attached to a foldable emergency road sign according to the present inventive concept.

As illustrated in FIGS. 8 and 9, a ring 123 protruding more than the diameter of the hollow shaft 120 is formed on an outer circumferential surface of the hollow shaft 120. A plurality of through holes "H" are formed at the ring 123, wherein the through holes are passed from top to down. A plurality of wires 126, an end portion of each of which is fixed at the compression ring 134, are intended to pass through the through holes "H" one to one, and the weight 124 is installed at the other end of the wire 126.

The weight 124 may be made of a nonmagnetic material.

At this time, the weight 124 may be made in a ring shape so that the engaging protrusion 125 is positioned in the center of the weight 124.

A rope or a nylon strap may be used instead of the wire 126.

Therefore, as illustrated in FIG. 9, in a state where the safety tripod 100 is folded in a straight shape, the compression ring 134 moves downward while compressing the spring 137 positioned at the lower side, and the weight 124 fixed at an end portion of the wire is positioned at a portion higher than the ground, namely, at a portion higher than the engaging protrusion 125 formed at an end portion of the hollow shaft 120.

As illustrated in FIG. 8, in a state where the safety tripod 100 is unfolded under an emergency situation, the spring 137 returns to the initial state, and the compression ring 134 moves upward along the hollow shaft 120, and the weight 124 fixed at an end portion of the wire 126 is positioned where it mounts on the ground.

The weight 124 allows the safety tripod 100 to stand stably against wind when the safety tripod 100 is installed on the ground. Since the ring-shaped magnet is attached on the lower side of the weight 124, it is possible to attach the foldable emergency road sign 100 onto an upper surface of the metallic trunk of the vehicle, thus more stably supporting the foldable emergency road sign 100.

In the present inventive concept, the ring-shaped magnet is named a magnetic ring 127, and the weight 124 and the magnetic ring 127 may be adhered using a typical adhesive or a housing-type engaging member wherein an engaging shoulder is formed so as to prevent the magnetic ring 127 from separating.

In addition, the magnetic ring 127 may be replaced with a plastic or synthetic resin material as disclosed in FIG. 10. In this case, a quadrangular box 128 with an inner space may be prepared, and a metallic cylindrical magnet 129 is inserted in the quadrangular box 128.

Since the above-described structure can move all the time in the direction to which attraction applies irrespective of magnetic substances or nonmagnetic substances since the cylindrical magnet 129 can rotate and move about the axial center in the inner space of the quadrangular box 128.

Namely, as for the fixed magnet, attraction applies between different magnetic poles in a metallic substance or a substance having a magnetic force, but the cylindrical magnet 129 can rotate to the position where attraction can apply about the axial center in the quadrangular box 128, even in case of a substance having a magnetic force.

The cylindrical magnet 129 retained in the quadrangular box 128 should be made to have a smaller diameter since the thickness of the quadrangular box 128 is limited. If the cylindrical magnet 129 is made of neodymium having the strongest magnetic force among the magnetic substances, the cylindrical magnet 129 can be stably attached to a metallic material, a vehicle, etc.

Therefore, the foldable emergency road sign can be quickly and easily installed using a button, while providing easier storing and carriage, and in addition, the foldable emergency road sign provides an improved visibility so that a driver of a following vehicle which runs at a high speed at night or a pedestrian can easily recognize from a distant or short distance and at a front side and a lateral side by installing LED light emitting units at regular intervals.

The invention claimed is:

1. A foldable emergency road sign, comprising:
a bar-shaped handle;
a hollow shaft connected to the bar-shaped handle;
a spring pipe, the spring pipe having a hole through which the hollow shaft is inserted;
a plurality of bodies connected to the spring pipe, wherein the plurality of bodies can be folded or unfolded to have a triangular pyramid shape or a quadrangular pyramid shape;
a light emitting diode attached at regular intervals to one side of the plurality of bodies;
a ring having a plurality of holes, the ring being formed on an outer circumferential surface of the hollow shaft;
a plurality of wires, one ends of the plurality of wires being inserted to respective holes; and
a magnet ring connected to the other ends of the plurality of wires.

2. The foldable emergency road sign of claim 1, further comprising a compression ring inserted outside of the hollow shaft; and
a plurality of first link shafts each connected between the compression ring and the plurality of bodies.

3. The foldable emergency road sign of claim 2, further comprising a housing into which a spring is inserted; and
a plurality of second link shafts connected between the housing and the plurality of the first link shafts, respectively.

4. The foldable emergency road sign of claim 3, further comprising an engaging protrusion disposed at one end of the hollow shaft.

5. The foldable emergency road sign of claim 4, further comprising an engaging groove disposed at the other end of the hollow shaft.

6. The foldable emergency road sign of claim 5, further comprising a reflection plate disposed between the bodies.

7. The foldable emergency road sign of claim 6, further comprising a magnet attached to the reflection plate and a metallic fixed piece configured to attach to the magnet.

8. The foldable emergency road sign of claim 7, further comprising a second foldable road sign,
wherein an engaging protrusion of the second foldable road sing is connected to the engaging groove disposed at the other end of the hollow shaft.

9. The foldable emergency road sign of claim 2, further comprising an engaging protrusion disposed at one end of the hollow shaft.

10. The foldable emergency road sign of claim 9, further comprising an engaging groove disposed at the other end of the hollow shaft.

11. The foldable emergency road sign of claim 2, further comprising an engaging groove disposed at the other end of the hollow shaft.

12. The foldable emergency road sign of claim 1, further comprising a housing into which a spring is inserted; and
a plurality of second link shafts connected between the housing and the plurality of the first link shafts, respectively.

13. The foldable emergency road sign of claim 12, further comprising an engaging protrusion disposed at one end of the hollow shaft.

14. The foldable emergency road sign of claim 13, further comprising an engaging groove disposed at the other end of the hollow shaft.

15. The foldable emergency road sign of claim 12, further comprising an engaging groove disposed at the other end of the hollow shaft.

16. The foldable emergency road sign of claim 1, further comprising an engaging protrusion disposed at one end of the hollow shaft.

17. The foldable emergency road sign of claim 16, further comprising an engaging groove disposed at the other end of the hollow shaft.

18. The foldable emergency road sign of claim 1, further comprising an engaging groove disposed at the other end of the hollow shaft.

* * * * *